United States Patent
Ito et al.

(10) Patent No.: US 12,412,097 B2
(45) Date of Patent: Sep. 9, 2025

(54) NEURAL NETWORK COMPRESSION DEVICE

(71) Applicant: Hitachi Astemo, Ltd., Hitachinaka (JP)

(72) Inventors: Hiroaki Ito, Hitachinaka (JP); Goichi Ono, Tokyo (JP); Riu Hirai, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 1019 days.

(21) Appl. No.: 17/298,801

(22) PCT Filed: Jan. 8, 2020

(86) PCT No.: PCT/JP2020/000231
§ 371 (c)(1),
(2) Date: Jun. 1, 2021

(87) PCT Pub. No.: WO2020/149178
PCT Pub. Date: Jul. 23, 2020

(65) Prior Publication Data
US 2022/0036190 A1    Feb. 3, 2022

(30) Foreign Application Priority Data
Jan. 18, 2019    (JP) .................. 2019-006660

(51) Int. Cl.
*G06N 3/082* (2023.01)

(52) U.S. Cl.
CPC .................. *G06N 3/082* (2013.01)

(58) Field of Classification Search
CPC .................. G06N 3/082
See application file for complete search history.

(56) References Cited

U.S. PATENT DOCUMENTS

2016/0379108 A1* 12/2016 Chung ............ G06N 3/045
706/27
2018/0204110 A1* 7/2018 Kim ............ G06N 3/045
(Continued)

FOREIGN PATENT DOCUMENTS

JP    H11-215380 A    8/1999

OTHER PUBLICATIONS

Baskin, C., Liss, N., Zheltonozhskii, E., Bronstein, A. M., & Mendelson, A. (May 2018). Streaming architecture for large-scale quantized neural networks on an FPGA-based dataflow platform. In 2018 IEEE International Parallel and Distributed Processing Symposium Workshops (IPDPSW) (pp. 162-169). IEEE. (Year: 2018).*
(Continued)

*Primary Examiner* — Michael J Huntley
*Assistant Examiner* — Maggie Thanh Maido
(74) *Attorney, Agent, or Firm* — Foley & Lardner LLP

(57) ABSTRACT

Processing time of a neural network is shortened, and the number of operations of the neural network is reduced such that a plurality of calculators can be effectively used. A neural network reduction device (100) that reduces the number of operations of a neural network by an operation device (140) including a plurality of calculators by reducing the neural network, the neural network reduction device including: a calculator allocation unit (102) that sets the number of calculators allocated to calculation processing of the neural network; a number-of-operations setting unit (103) that sets the number of operations of a reduced neural network based on the number of allocated calculators; and a neural network reduction unit (104) that reduces the neural network such that the number of operations of the neural network by the operation device (140) is equal to the number of operations set by the number-of-operations setting unit (103).

7 Claims, 11 Drawing Sheets

(56) References Cited

U.S. PATENT DOCUMENTS

2020/0184333 A1* 6/2020 Oh .................... G06N 3/044
2020/0285950 A1* 9/2020 Baum .................. G06N 3/04
2021/0295174 A1* 9/2021 Zhang ................. G06N 3/082

OTHER PUBLICATIONS

Salamat, S., Imani, M., Gupta, S., & Rosing, T. (Nov. 2018). Rnsnet: In-memory neural network acceleration using residue number system. In 2018 IEEE International Conference on Rebooting Computing (ICRC) (pp. 1-12). IEEE. (Year: 2018).*
Chakradhar, S., Sankaradas, M., Jakkula, V., & Cadambi, S. (Jun. 2010). A dynamically configurable coprocessor for convolutional neural networks. In Proceedings of the 37th annual international symposium on Computer architecture (pp. 247-257). (Year: 2010).*
Fujii, T., Sato, S., Nakahara, H., & Motomura, M. (Apr. 2017). An FPGA realization ofa deep convolutional neural network using a threshold neuron pruning. In Applied Reconfigurable Computing: 13th Int Symposium, ARC 2017, Delft, The Netherlands, Apr. 3-7, 2017, Proceedings 13 (pp. 268-280). (Year: 2017).*
Posewsky, T., & Ziener, D. (Apr. 2018). Throughput optimizations for FPGA-based deep neural network inference. Microprocessors and microsystems, 60, 151-161. (Year: 2018).*
International Search Report with English translation and Written Opinion issued in corresponding application No. PCT/JP2020/000231 dated Mar. 24, 2020.
Han et al., "Learning both Weights and Connections for Efficient Neural Networks", [online], Oct. 30, 2015, [searched on Dec. 24, 2018], Internet <URL: https://arxiv.org/pdf/1506.02626.pdf>.
Kojima et al., Hitachi Review, Driving Forward with Future Vehicles, "Intelligent technology to support the advancement of automated driving, 4. 1 Technique for Neural Network Compression", Hitachi Review, vol. 99, No. 5, Oct. 2017, pp. 52-56, 8 pages, with partial English translation.
Yoshida, "Layer-unified Execution Control Scheme for Coarse Grain Task Parallel Processing, 2.2 Execution system for coarse grain task parallel processing; 6.1 Comparison of performance between layer-unified execution control and layered execution control using Turb3d program", IPSJ Journal, vol. 45, No. 12, ISSN 0387-5806, Dec. 2004, pp. 2732-2740, 13 pages, with partial English translation.

* cited by examiner

NEURAL NETWORK COMPRESSION DEVICE

TECHNICAL FIELD

The present invention relates to a neural network reduction device.

BACKGROUND ART

In recent years, techniques for applying object recognition and behavior prediction using machine learning to autonomous driving of a vehicle have been developed. A neural network is known as a machine learning method used for the object recognition or the like. In a neural network, a convolution operation or the like having a large number of operations is performed, which is a problem when an operation device mounted on the vehicle performs processing in real time. In order to solve the above problem, there is disclosed a reduction method (compression method) of reducing a calculation load of a neural network while suppressing an effect on recognition performance by reducing branches (interlayer connections) where a weighting factor of each node of the neural network is below a threshold (see NPL 1).

CITATION LIST

Non-Patent Literature

NPL 1: Song Han, JeffPool, John Tran, William J. Daily, "Learning both Weights and Connections for Efficient Neural Networks", [online], Oct. 30, 2015, [searched on Dec. 24, 2018], Internet <URL: https://arxiv.org/pdf/1506.02626.pdf>

SUMMARY OF INVENTION

Technical Problem

NPL 1 discloses the method of reducing the number of operations of the neural network by reducing some branches of the neural network. However, even if the number of operations is reduced, processing time of calculation processing is not necessarily reduced. In addition, there is a case where a plurality of calculators provided in a calculator are not effectively used for the calculation processing of the neural network. Such a problem is likely to occur not only in an in-vehicle operation device but also in other operation devices using a neural network.

The present invention has been made to solve the above-described problem, and an object thereof is to provide a neural network reduction device capable of shortening processing time of a neural network and reducing the number of operations of the neural network such that a plurality of calculators can be effectively used.

Solution to Problem

A neural network reduction device according to an aspect of the present invention is a neural network reduction device that reduces the number of operations of a neural network by an operation device including a plurality of calculators by reducing the neural network, and includes: a calculator allocation unit that sets the number of the calculators allocated to calculation processing of the neural network; a number-of-operations setting unit that sets the number of operations of the reduced neural network based on the number of the allocated calculators; and a neural network reduction unit that reduces the neural network such that the number of operations of the neural network by the operation device is equal to the number of operations set by the number-of-operations setting unit.

Advantageous Effects of Invention

According to the present invention, the processing time of the neural network can be shortened, and the number of operations of the neural network can be reduced such that the plurality of calculators can be effectively used. Another characteristic relating to the present invention will become apparent from the description of the present specification and the accompanying drawings. In addition, other objects, configurations, and effects will be apparent from the following description of embodiments.

DESCRIPTION OF EMBODIMENTS

First Embodiment

Hereinafter, an autonomous driving system to which a neural network reduction device is applied will be described with reference to the accompanying drawings. FIG. is a block diagram of an autonomous driving system according to a first embodiment. Note that the example in which the neural network reduction device is applied to the autonomous driving system will be described in the following description, but the reduction device of the neural network can be applied to other systems such as a surveillance camera system, a medical image diagnosis system, and a voice recognition system.

Figure 1:
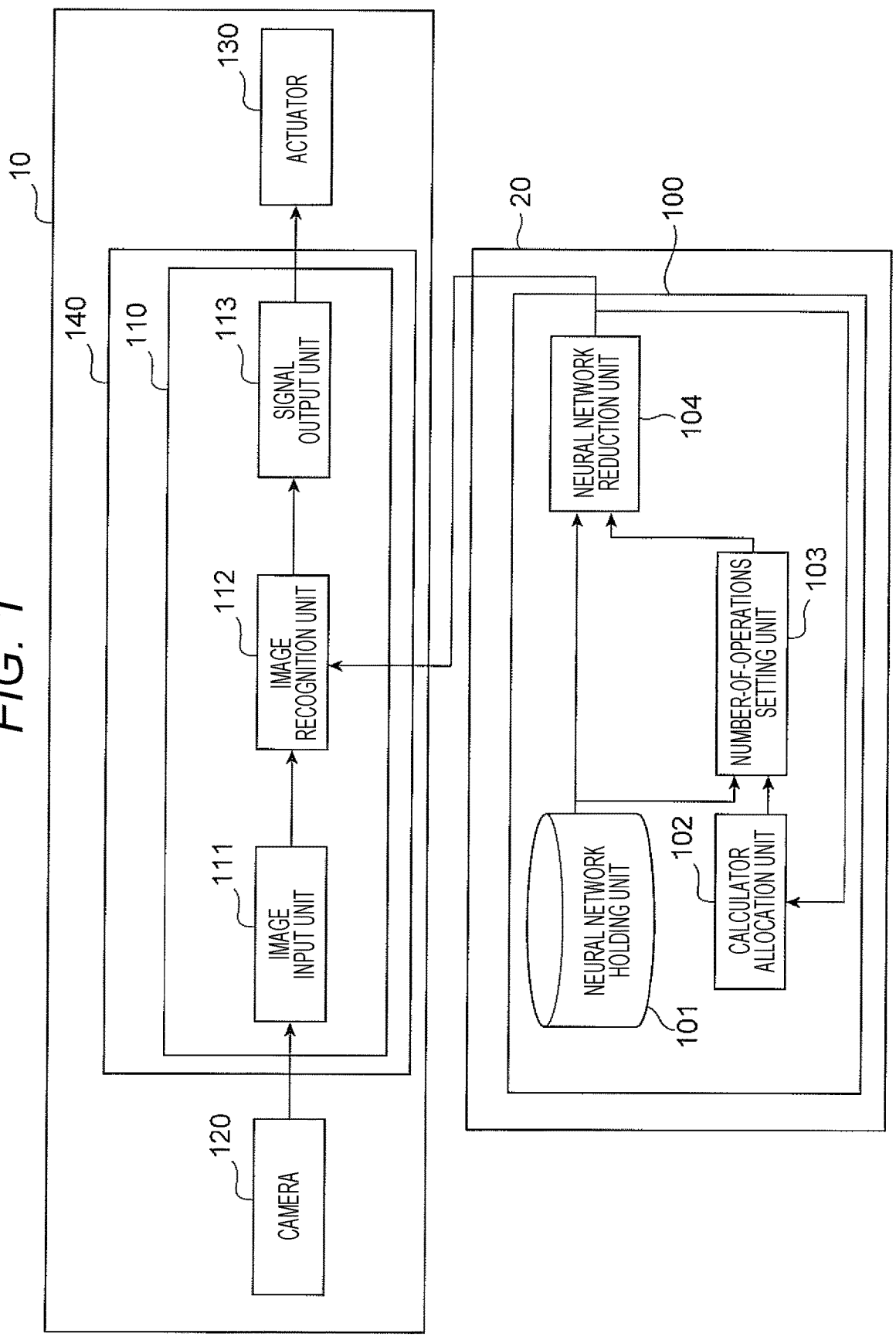
FIG. 1 is a block diagram of an autonomous driving system according to a first embodiment.

In the autonomous driving system, a vehicle 10 that performs autonomous driving using a neural network and a server 20 that periodically notifies the vehicle 10 of a parameter of the neural network are connected by wireless communication as illustrated in FIG. 1. The vehicle 10 is provided with: a camera 120 that captures an image of the periphery of the vehicle; a vehicle control unit 110 that controls the autonomous driving of the vehicle 10; and an actuator 130 used for various operations such as an accelerator, a brake, and a steering. On the server 20, a neural network reduction device 100 that reduces the number of operations of the neural network by a reduction technique is mounted.

The vehicle control unit 110 is provided with: an image input unit 111 that converts the image input from the camera 120 into a predetermined format; an image recognition unit 112 that recognizes the image using the neural network; and a signal output unit 113 that outputs a control signal corresponding to a recognition result to the actuator 130. The image recognition unit 112 is notified of the parameter of the reduced neural network from the neural network reduction device 100. The parameter of the neural network is a parameter for constructing a reduced neural network in the image recognition unit 112, and is, for example, a weighting factor used in the neural network.

The image recognition unit 112 constructs the reduced neural network based on the parameter notified from the neural network reduction device 100, and recognizes the image input from the image input unit 111 using the neural network. The signal output unit 113 outputs the control signal including vehicle control information necessary for autonomous driving such as a traveling direction and a traveling speed of a host vehicle to the actuator 130 based on the recognition result of the image. The actuator 130 includes a driving actuator for the accelerator, a braking actuator for the brake, a steering actuator for the steering, and the like. The actuator 130 controls the vehicle 10 based on the control signal from the signal output unit 113.

The vehicle control unit 110 is realized by an operation device 140 including a plurality of calculators. The calculators of the operation device 140 are allocated to various types of processing of the vehicle control unit 110. As the various types of processing of the vehicle control unit 110 are executed by the plurality of calculators of the operation device 140, the image recognition using the neural network is performed, and autonomous driving control of the vehicle 10 is performed based on the recognition result. Note that image recognition processing has a large calculation load among the various types of processing of the vehicle control unit 110, and thus, a larger number of calculators are allocated to the image recognition processing as compared with other processing of the vehicle control unit 110.

The neural network reduction device 100 is provided with a neural network holding unit 101, a calculator allocation unit 102, a number-of-operations setting unit 103, and a neural network reduction unit 104. The neural network holding unit 101 holds a learned neural network after being learned in a PC, a server, or the like, that is, a neural network used for inference processing. When the image recognition unit 112 performs the image recognition using the neural network, the calculator allocation unit 102 sets the number of calculators of the operation device 140 to be allocated to the calculation processing of the neural network. In this case, the calculator allocation unit 102 sets the number of allocated calculators, input from a user via an input device or the like, in the reduction device 100.

The number-of-operations setting unit 103 calculates the number of operations required for the calculation processing of the neural network held in the neural network holding unit 101, and sets the number of operations of the reduced neural network based on the number of allocated calculators. The neural network reduction unit 104 reduces the neural network held in the neural network holding unit 101 such that the number of operations of the neural network by the operation device 140 is equal to the number of operations set by the number-of-operations setting unit 103. In addition, the neural network reduction unit 104 notifies the parameter of the reduced neural network to the image recognition unit 112 of the vehicle 10 to reduce the number of operations of the neural network used for the image recognition processing of the image recognition unit 112.

Note that the respective units of the neural network reduction device 100 may be realized by software using a processor, or may be realized by a logic circuit (hardware) formed in an integrated circuit or the like. In the case of using the processor, the processor reads and executes a program stored in a memory to perform the various types of processing. As the processor, for example, a central processing unit (CPU), a micro processing unit (MPU), a graphics processing unit (GPU), or the like is used. In addition, the memory is configured using one or a plurality of recording media such as a read only memory (ROM) and a random access memory (RAM) depending on an application.

Figure 2:
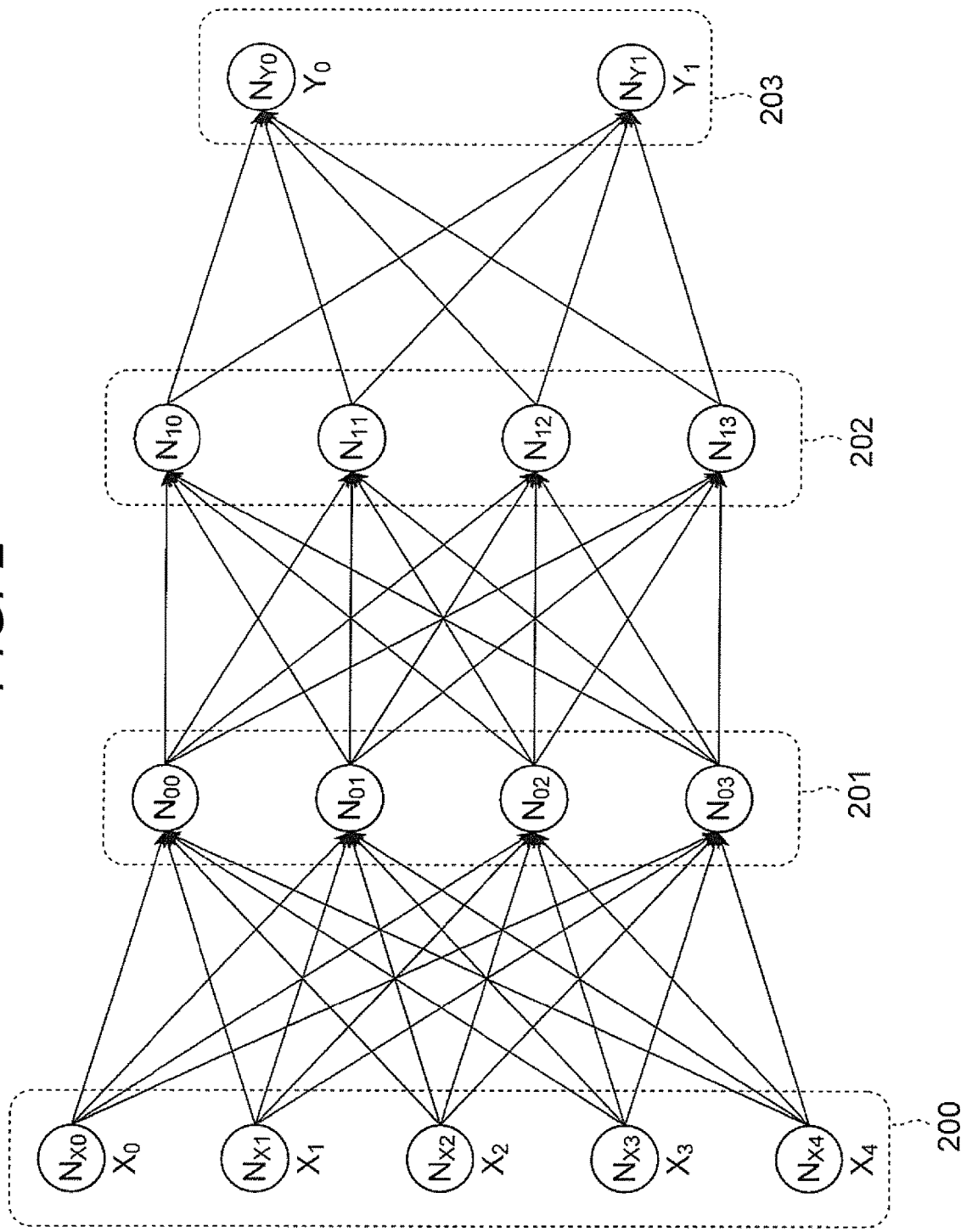
FIG. 2 is a view illustrating an example of a neural network according to the first embodiment.
Figure 3:
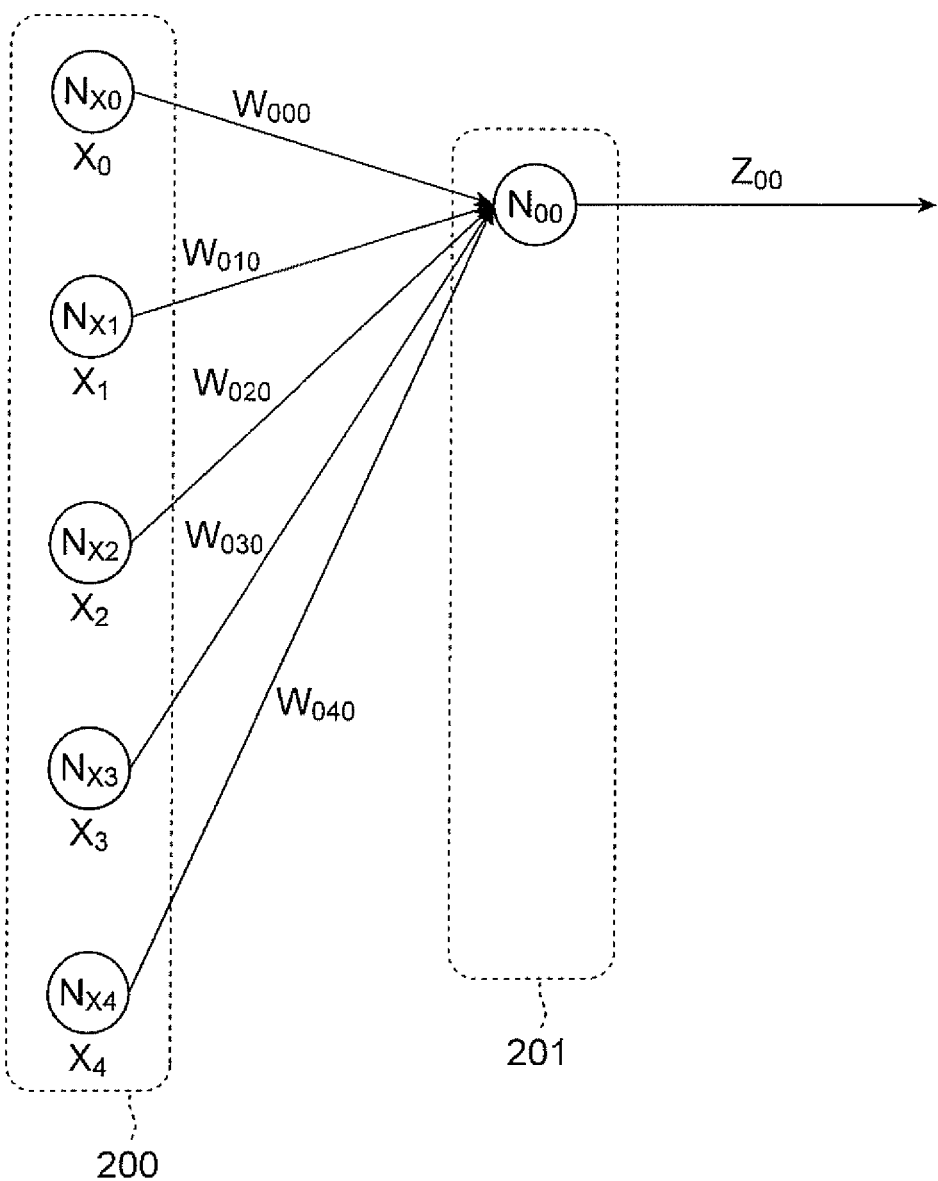
FIG. 3 is a view illustrating an example of node processing of a first intermediate layer according to the first embodiment.
Figure 5:
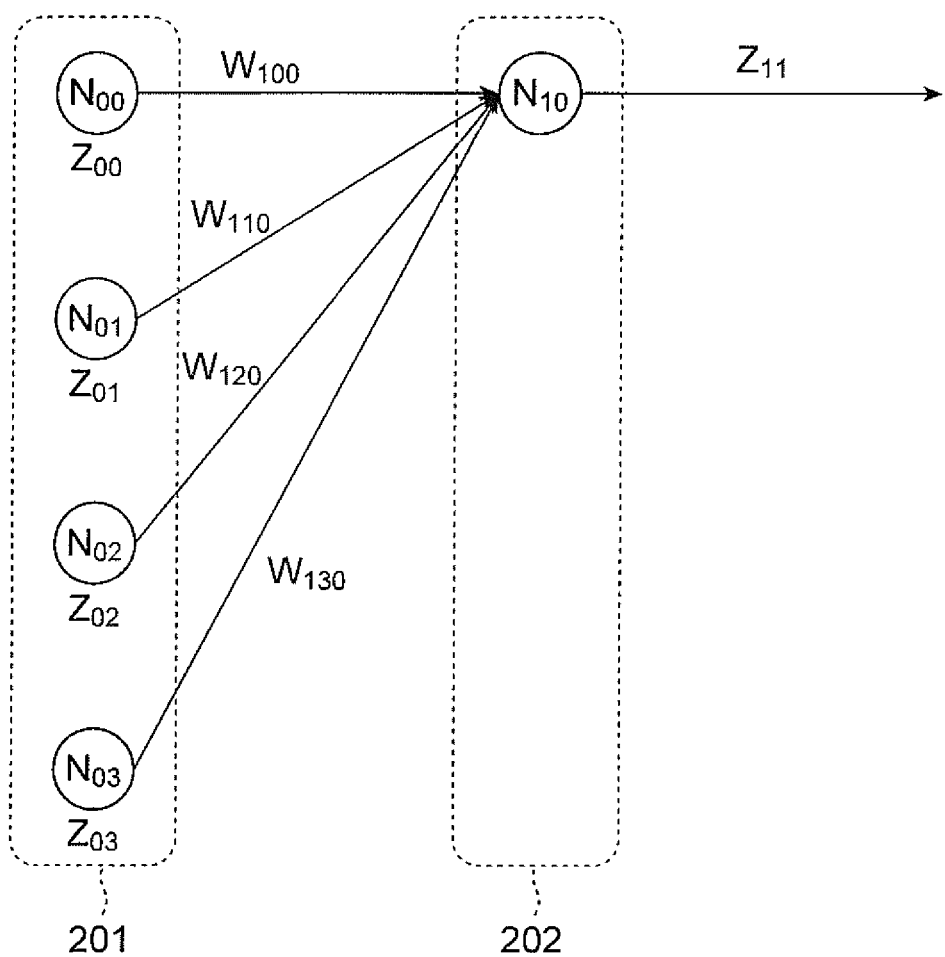
FIG. 5 is a view illustrating an example of node processing of a second intermediate layer according to the first embodiment.
Figure 6:
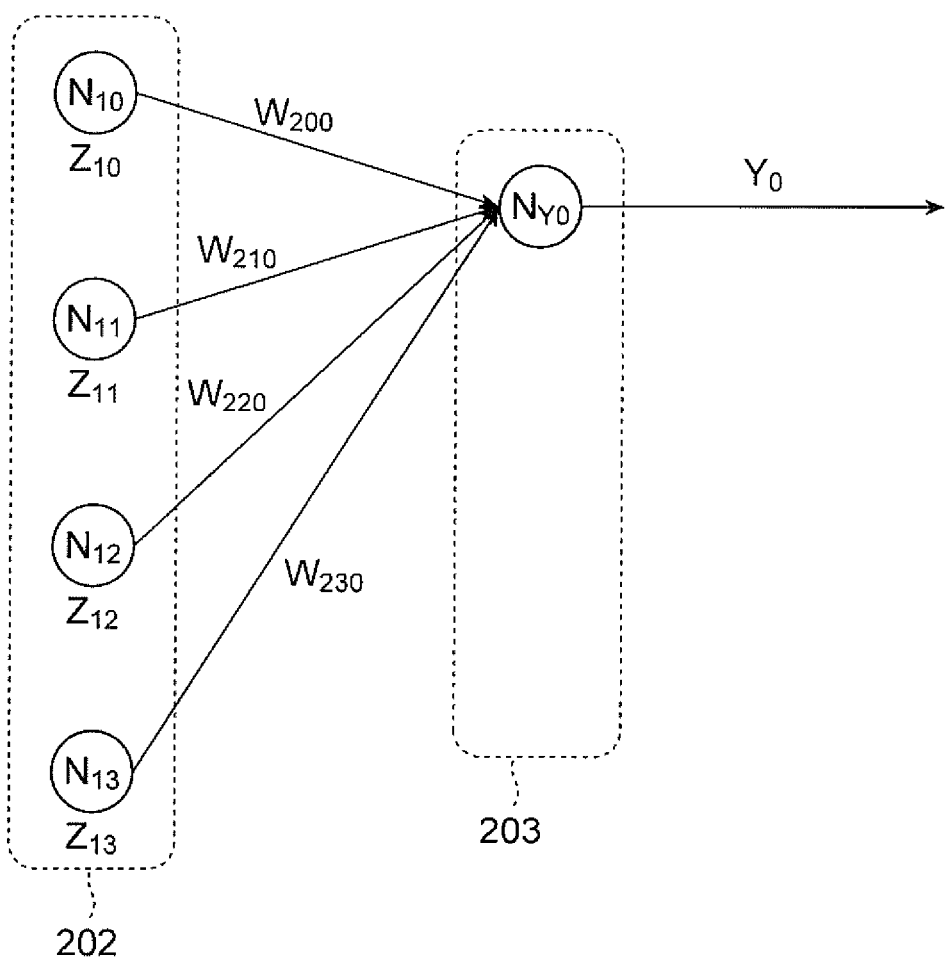
FIG. 6 is a view illustrating an example of node processing of an output layer according to the first embodiment.
Figure 7:
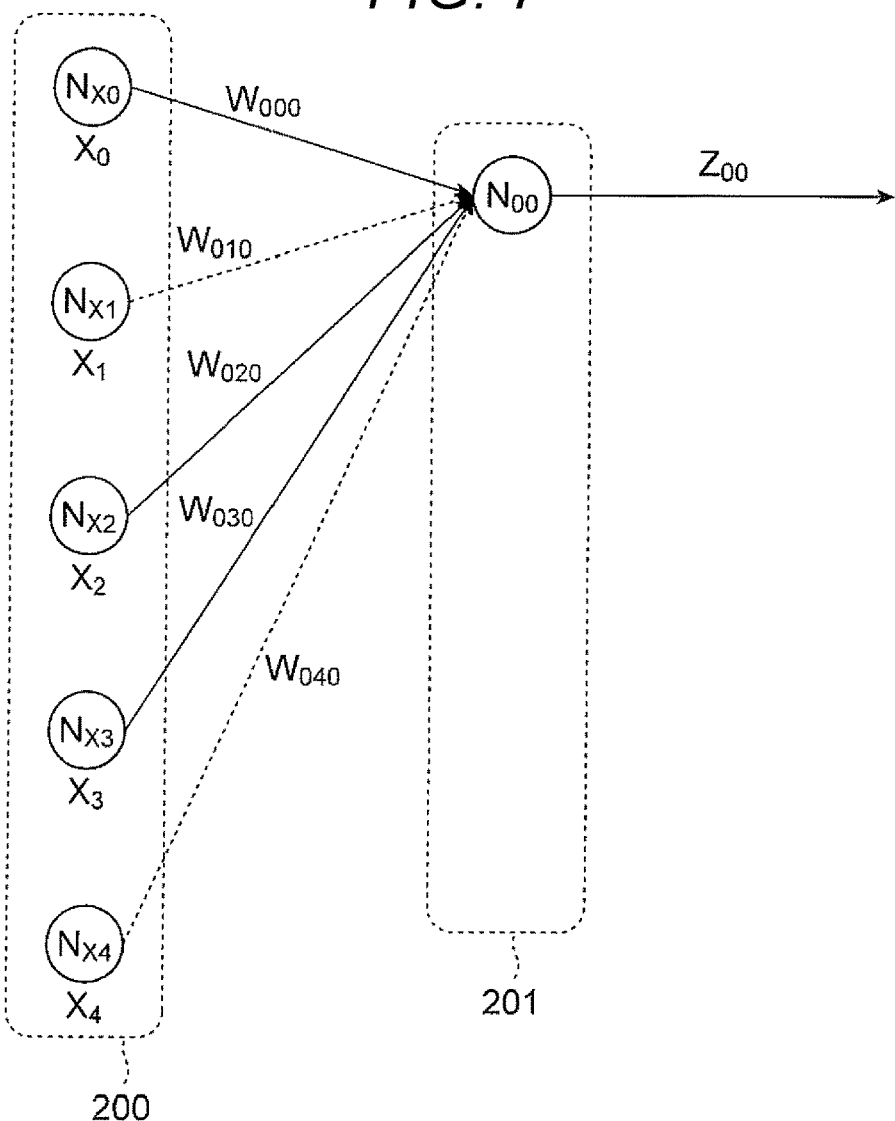
FIG. 7 is a view illustrating an example of reduction processing according to the first embodiment.

Hereinafter, the neural network reduction device 100 will be described using a specific example. FIG. 2 is a view illustrating an example of the neural network according to the first embodiment. FIG. 3 is a view illustrating an example of node processing of a first intermediate layer according to the first embodiment. FIG. is a view illustrating another example of the node processing of the first intermediate layer according to the first embodiment. FIG. 5 is a view illustrating an example of node processing of a second intermediate layer according to the first embodiment. FIG. 6 is a view illustrating an example of node processing of an output layer according to the first embodiment. FIG. 7 is a view illustrating an example of reduction processing according to the first embodiment. In addition, reference signs in FIG. 1 are used as appropriate for convenience of the description in the following description.

As illustrated in FIG. 2, the neural network includes an input layer 200, a first intermediate layer 201, a second intermediate layer 202, and an output layer 203. When five input values $X_0$ to $X_4$ are input to the input layer 200, the neural network outputs two output values $Y_0$ and $Y_1$ from the output layer 203 via the first and second intermediate layers 201 and 202. The input layer 200 is provided with five input nodes $N_{X0}$ to $N_{X4}$ as input elements, and the output layer 203 is provided with two output nodes $N_{Y0}$ and $N_{Y1}$ as output elements. Nodes $N_{00}$ to $N_{03}$ are provided as calculation elements in the first intermediate layer 201, and nodes $N_{10}$ to $N_{13}$ are provided in the second intermediate layer 202.

The nodes $N_{00}$ to $N_{03}$ of the first intermediate layer 201 multiply the input value $X_0$ to $X_4$ input from the input layer 200 by a weighting factor set for each interlayer connection (branch), and output a result obtained by adding each multiplication result to the nodes $N_{10}$ to $N_{13}$ of the second intermediate layer 202. The nodes $N_{10}$ to $N_{13}$ of the second intermediate layer 202 multiply values input from the nodes $N_{00}$ to $N_{03}$ of the first intermediate layer 201 by a weighting factor set for each interlayer connection, and output a result obtained by adding each multiplication result to the output nodes $N_{Y0}$ and $N_{Y1}$ of the output layer 203. The output nodes $N_{Y0}$ and $N_{Y1}$ of the output layer 203 multiply a value input from the nodes $N_{10}$ to $N_{13}$ of the second intermediate layer 202 by a weighting factor set for each interlayer connection, and output a result obtained by adding each multiplication result as the output values $Y_0$ and $Y_1$.

Here, calculation processing of each node will be described in detail. FIG. 3 illustrates calculation processing of the node $N_{00}$ of the first intermediate layer 201. In FIG. 3, the node $N_{00}$ of the first intermediate layer 201 uses weighting factors $W_{000}$ to $W_{040}$ between layers of the input nodes $N_{X0}$ to $N_{X4}$ of the input layer 200 and the node $N_{00}$, and the output value $Z_{00}$ output from the node $N_{00}$ is obtained by the following Formula (1).

$$Z_{00}=X_0*W_{000}+X_1*W_{010}+X_2*W_{020}+X_3*W_{030}+X_4*W_{040} \quad (1)$$

Figure 4:
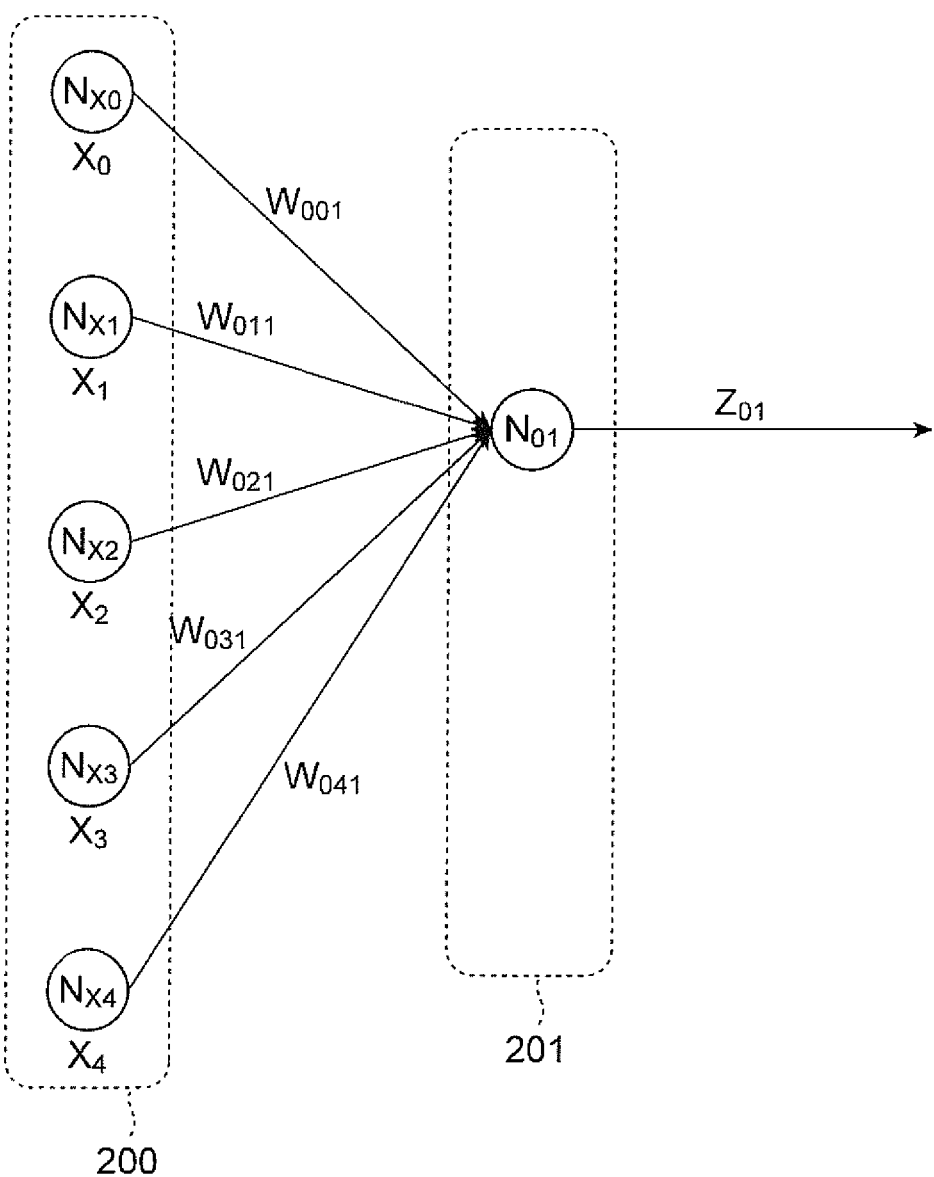
FIG. 4 is a view illustrating another example of the node processing of the first intermediate layer according to the first embodiment.

FIG. 4 illustrates calculation processing of the node $N_{01}$ of the first intermediate layer 201. In FIG. 4, the node $N_{01}$ of the first intermediate layer 201 uses weighting factors $W_{001}$ to $W_{041}$ between layers of the input nodes $N_{X0}$ to $N_{X4}$ of the input layer 200 and the node $N_{01}$, and the output value $Z_{01}$ output from the node $N_{01}$ is obtained by the following Formula (2). Output values $Z_{02}$ and $Z_{03}$ are similarly output to the other nodes $N_{02}$ and $N_{03}$ of the first intermediate layer 201.

$$Z_{01}=X_0*W_{001}+X_1*W_{011}+X_2*W_{021}+X_3*W_{071}+X_4*W_{041} \quad (2)$$

FIG. 5 illustrates calculation processing of the node $N_{10}$ of the second intermediate layer 202. In FIG. 5, the node $N_{10}$ of the second intermediate layer 202 uses weighting factors $W_{100}$ to $W_{130}$ between layers of the nodes $N_{00}$ to $N_{03}$ of the first intermediate layer 201 and the node $N_{10}$, and an output value $Z_{11}$ output from the node $N_{10}$ is obtained by the following Formula (3). Output values $Z_{11}$ and $Z_{13}$ are similarly output to the other nodes $N_{11}$ and $N_{13}$ of the second intermediate layer 202.

$$Z_{11}=Z_{00}*W_{100}+Z_{01}*W_{110}+Z_{02}*W_{120}+Z_{03}*W_{130} \quad (3)$$

FIG. 6 illustrates calculation processing of the output node $N_{Y0}$ of the output layer 203. In FIG. 6, the output node $N_{Y0}$ of the output layer 203 uses weighting factors $W_{200}$ to $W_{230}$ between layers of the node $N_{10}$ to $N_{13}$ of the second intermediate layer 202 and the output node $N_{Y0}$, and the output value $Y_0$ output from the output node $N_{Y0}$ is obtained by the following Formula (4). The output value $Y_1$ is similarly output to the other output node $N_{Y1}$ of the output layer 203.

$$Y_0=Z_{10}*W_{200}+Z_{11}*W_{210}+Z_{12}*W_{220}+Z_{13}*W_{230} \quad (4)$$

The neural network of the present embodiment is used in the image recognition unit 112 for autonomous driving. The input values $X_0$ to $X_4$ of an image are input from the image input unit 111 to the input nodes $N_{X0}$ to $N_{X4}$ of the input layer 200, and the output values $Y_0$ and $Y_1$, which are image recognition results, are output from the output nodes $N_{Y0}$ and $N_{Y1}$ of the output layer 203. For example, the probability that the image is another vehicle is output as $Y_0$, and the probability that the image is a pedestrian is output as $Y_1$. When the probability that the image is the other vehicle is high, the host vehicle is controlled by the vehicle control unit 110 to follow the other vehicle. When the probability that the image is the pedestrian is high, the host vehicle is controlled to avoid the pedestrian. In this manner, the neural network includes a network configuration and a weighting factor for obtaining a desired output value from an input value, and the neural network holding unit 101 stores various types of information such as the network configuration and the weighting factor.

Next, a specific operation of the neural network reduction device 100 will be described. The calculator allocation unit 102 sets the number of calculators to be allocated to calculation processing of the neural network, that is, image recognition processing of the image recognition unit 112. In this case, the number of allocated calculators for the image recognition processing is set in consideration of processing load of each unit of the vehicle control unit 110, among the plurality of calculators of the operation device 140 mounted on the vehicle 10. Examples of the operation device 140 used in an embedded system such as the autonomous driving system of the present embodiment include a field programmable gate array (FPGA). The FPGA is the operation device 140 capable of designing and executing desired processing in a format of a logic circuit. The FPGA is equipped with a calculator called a digital signal processor (DSP) and capable of processing a product-sum operation at high speed, and is useful for processing multiplication and addition of a neural network at a high speed. Since the number of mounted DSPs is determined in advance for each FPGA, the number of DSPs used for calculation processing of the neural network is set by the calculator allocation unit 102. Note that the number of operations of the neural network is generally much larger than the number of DSPs of the FPGA, and it is difficult to process the entire neural network at a time. Therefore, the calculation processing of the neural network is performed a plurality of times. In addition, the operation device 140 is not limited to the FPGA, and may include a plurality of product-sum calculators that can be used for the neural network.

The number-of-operations setting unit 103 calculates the number of operations of the neural network before reduction. As an example, the number of operations required for the calculation processing of the neural network illustrated in FIG. 2 will be described. The calculation processing of each node of the first intermediate layer 201 requires a total of nine times of operations of five times of multiplication and four times of addition as illustrated in the above Formula (1). Since the first intermediate layer 201 includes the four nodes $N_{00}$ to $N_{03}$, the number of operations required for the calculation processing of the first intermediate layer 201 is 9*4=36. Similarly, the calculation processing of each node of the second intermediate layer 202 requires a total of seven times of operations of four times of multiplication and three times of addition as illustrated in the above Formula (3). Since the second intermediate layer 202 includes four nodes of the node $N_{10}$ to the node $N_{13}$, the number of operations required for the calculation processing of the second intermediate layer 202 is 7*4=28. The calculation processing of each output node of the output layer 203 requires a total of seven times of operations of four times of multiplication and three times of addition as illustrated in the above Formula (4). Since the output layer 203 includes two nodes of the output nodes $N_{Y0}$ and $N_{Y1}$, the number of operations required for the calculation processing of the output layer 203 is 7*2=14. When the number of operations of each layer is summed up, the number of operations required for the calculation processing of the neural network illustrated in FIG. 2 is expressed by the following Formula (5).

$$36 \text{ times} + 28 \text{ times} + 14 \text{ times} = 78 \text{ times} \quad (5)$$

There is a large-scale neural network in which the number of operations exceeds 1 million times as a neural network to be actually used, but the neural network will be described in a simplified manner in the present embodiment for convenience of the description.

Next, the number-of-operations setting unit 103 sets the number of operations of the reduced neural network to be smaller than the number of operations of the neural network before reduction and be an integral multiple of the number of allocated calculators set by the calculator allocation unit 102. As obtained by the above Formula (5), the number of operations of the neural network before reduction is 78. Here, for example, assuming that the number of allocated calculators is 20, the number of operations of the reduced neural network is set by the following Formula (6). Note that mod(A, B) in Formula (6) represents processing of calculating a remainder when A is divided by B.

$$78-\mathrm{mod}(78,20)=60 \qquad (6)$$

The neural network reduction unit 104 reduces the neural network so as to reduce 18 operations, which is a difference between the number of operations of the neural network before reduction, which is 78, and the number of operations set by the number-of-operations setting unit 103 which is 60. The number of operations of the neural network before reduction may be acquired from the number-of-operations setting unit 103 by the neural network reduction unit 104, or may be calculated by the neural network reduction unit 104 similarly to the number-of-operations setting unit 103. A method for reducing the neural network is not particularly limited, but the pruning processing will be described as an example in the present embodiment. In the pruning processing, multiplication processing of multiplying an input value by a weighting factor is reduced by assuming that an effect on the output value $Z_{00}$ is sufficiently small when an absolute value of the weighting factor is less than a predetermined threshold. The neural network is reduced by reducing weighting factors in ascending order of absolute values of the weighting factors of the neural network.

For example, as illustrated in FIG. 3, a total of nine times of operations of five times of multiplication and four times of addition are required as illustrated in the above Formula (1) in order to obtain the output value $Z_{00}$ of the node $N_{00}$ of the first intermediate layer 201. At this time, when absolute values of weighting factors $W_{010}$ and $W_{040}$ are less than the threshold as illustrated in FIG. 7, multiplication processing of the input value $X_1$ and the weighting factor $W_{010}$ and multiplication processing of the input value $X_4$ and the weighting factor $W_{040}$ are reduced. As a result, the output value $Z_{00}$ of the node $N_{00}$ of the first intermediate layer 201 is obtained by the following Formula (7). In Formula (7), the number of operations of the node $N_{00}$ is five times in total including three times of multiplication and two times of addition, so that the number of operations is reduced by four times as compared with Formula (1). In this manner, the pruning processing reduces the number of operations by deleting a connection between nodes having a smaller effect on the output.

$$Z_{00}=X_0*W_{000}+X_2*W_{020}X_3*W_{030} \qquad (7)$$

Figure 8:
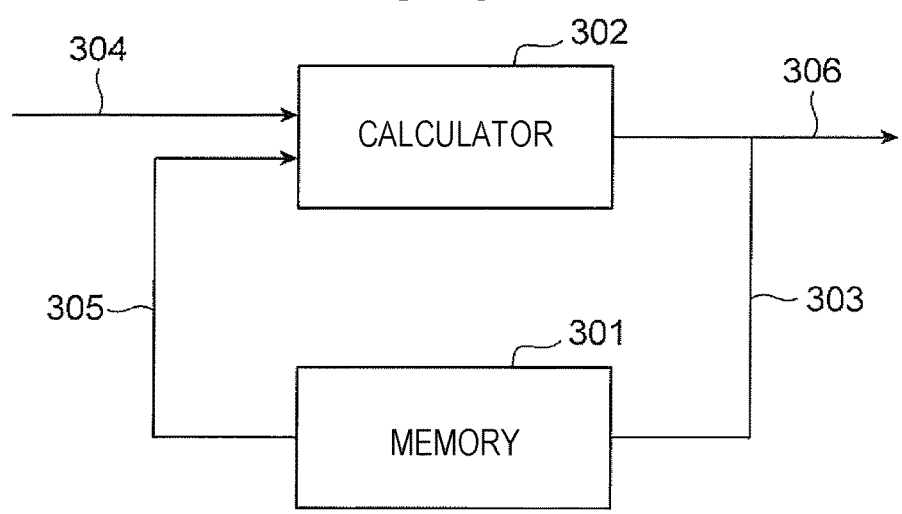
FIG. 8 is a block diagram illustrating a part of an operation device according to the first embodiment.
Figure 9:
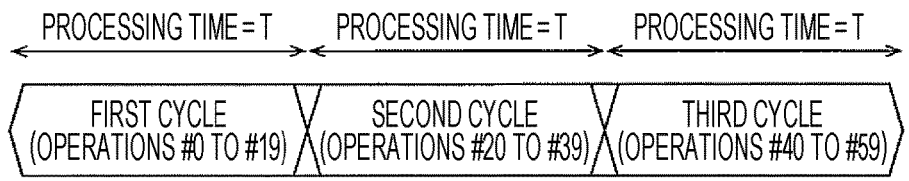
FIG. 9 is a view illustrating an example of a timing chart of calculation processing of a neural network.
Figure 10:
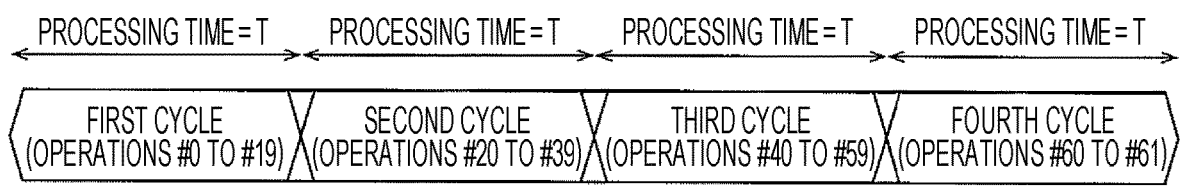
FIG. 10 is a view illustrating an example of the timing chart of the calculation processing of the neural network.
Figure 11:
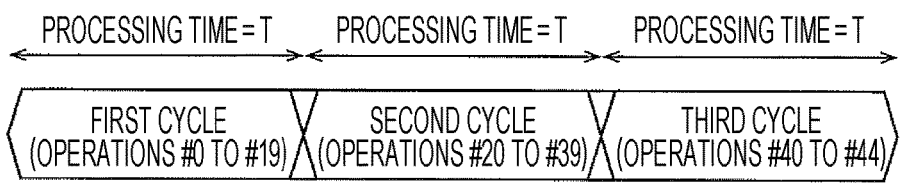
FIG. 11 is a view illustrating an example of the timing chart of the calculation processing of the neural network.

Processing time of calculation processing of the neural network will be described. FIG. 8 is a block diagram illustrating a part of the operation device according to the first embodiment. FIG. 9 is a view illustrating an example of a timing chart of the calculation processing of the neural network. FIG. 10 is a view illustrating another example of the timing chart of the calculation processing of the neural network. FIG. 11 is a view illustrating still another example of the timing chart of the calculation processing of the neural network.

As illustrated in FIG. 8, intermediate data 303 calculated by a calculator 302 is stored in a memory 301. In addition, the calculation processing is repeated by the calculator 302 using an input value 304 and the intermediate data 305 stored in the memory 301. When the entire calculation processing is ended by the calculator 302, a calculation result 306 is output from the calculator 302. Assuming that the number of the allocated calculators 302 is 20 and the number of operations required for the reduced neural network is 60 times, the calculation result 306 is output after three cycles of calculation processing are performed for one calculator 302. As illustrated in FIG. 9, assuming that the processing time required for calculation processing for one cycle (one time) by each of the calculators 302 is T, 60 times of calculation processing (#0 to #59) is ended within the processing time T for three cycles as the entire neural network. Note that the processing time T indicates processing time for one cycle by one calculator 302, but the calculation processing is performed in parallel by the twenty calculators 302 for the processing time T.

FIG. 10 illustrates a case where the number of operations of the neural network is reduced without considering the number of allocated calculators 302. Here, as an example, a case where the number of allocated calculators 302 is set to 20 and the number of operations of the neural network is reduced from 78 times to 62 times will be described. As compared with the case where the number of operations of the neural network is 60 times, the number of operations is increased by only twice (#60 and #61), but the processing time T for four cycles is required as the entire neural network, so that the processing time T for one cycle increases.

Similarly, FIG. 11 illustrates a case where the number of operations of the neural network is reduced without considering the number of allocated calculators 302. Here, as an example, a case where the number of allocated calculators 302 is set to 20 and the number of operations of the neural network is reduced from 78 times to 45 times will be described. All of the twenty calculators 302 are used in calculation processing of the first cycle and calculation processing of the second cycle, but only five out of the twenty calculators 302 are used in calculation processing of the third cycle. Therefore, the processing time of the calculation processing is not shortened although the number of operations is reduced by 15 times as compared with the case where the number of operations of the neural network is 60 times. In particular, the calculator 302 is not effectively used in the calculation processing of the third cycle, and there is a possibility that the recognition performance of the image recognition unit 112 deteriorates.

As described above, the number of operations of the neural network used for image recognition of the image input from the camera is reduced to an integral multiple of the number of allocated calculators 302 set by the calculator allocation unit 102 in the autonomous driving system of the first embodiment. As a result, the calculation processing is simultaneously started by the plurality of calculators 302 allocated to the calculation processing of the neural network, and the calculation processing is simultaneously ended. There is no cycle at which calculation is performed by only some of the calculators 302, and the processing time of the calculation processing can be shortened and the use efficiency of the plurality of calculators 302 can be maximized.

In addition, the present invention is not limited to the configuration in which the total number of operations from the first intermediate layer 201 to the output layer 203 of the neural network is reduced, and the number of operations may be reduced for each layer of the neural network.

As described above, the number of operations of the first intermediate layer 201 of the neural network illustrated in FIG. 2 is 36, the number of operations of the second intermediate layer 202 is 28, and the number of operations of the output layer 203 is 14. In this case, the number of allocated calculators 302 is set for each layer of the neural network by the calculator allocation unit 102 (see FIG. 1). The number of allocated calculators 302 with respect to the first intermediate layer 201 is set to eight, the number of allocated calculators 302 with respect to the second intermediate layer 202 is set to eight, and the number of allocated calculators 302 with respect to the output layer 203 is set to four.

In addition, the number of operations is set for each layer of the reduced neural network by the number-of-operations setting unit 103 (see FIG. 1). The number of operations for the first intermediate layer 201 is set by the following Formula (8), the number of operations for the second intermediate layer 202 is set by the following Formula (9), and the number of operations for the output layer 203 is set by the following Formula (10). Note that the number of allocated calculators 302 is individually set for each layer in Formulas (8) to (10), but the same number of allocated calculators 302 may be set for each layer.

$$36 - \mathrm{mod}(36,8) = 32 \tag{8}$$

$$28 - \mathrm{mod}(28,8) = 24 \tag{9}$$

$$14 - \mathrm{mod}(14,4) = 12 \tag{10}$$

If the number of operations is set for each layer of the neural network, the number of operations is reduced for each layer of the neural network by the neural network reduction unit 104 using a reduction method such as pruning. Four times of calculation processing in the first intermediate layer 201 are reduced, four times of calculation processing in the second intermediate layer 202 are reduced, and two times of calculation processing in the output layer 203 are reduced. In this manner, the calculation processing can be performed with a relatively small number of (for example, eight) allocated calculators 302 by setting the number of operations for each layer of the neural network by the number-of-operations setting unit 103, and thus, the mounting scale of the operation device 140 can be reduced.

The number-of-operations setting unit 103 is not limited to the configuration in which the number of operations of the reduced neural network is set by subtracting a remainder, obtained by dividing the number of operations required for the calculation processing of the neural network by the number of allocated calculators 302, from the number of operations. It suffices that the number-of-operations setting unit 103 sets an integral multiple of the number of allocated calculators 302. For example, the number-of-operations setting unit 103 may set the number of operations using the following Formula (11).

$$\text{Number of operations after reduction} = 78 - \mathrm{mod}(78, 20) - 20 \times n \tag{11}$$

($n=0, 1, 2,$ and so on, wherein, the number of operations after reduction is a positive number)

When $n=0$, Formula (11) is the same as Formula (6). When $n=1$, the number of operations is set to 40 times by the following Formula (12). When the number of operations is set to 40 times, the neural network reduction unit 104 performs the pruning processing so as to reduce the number of operations corresponding to $78-40=38$ times. In this case, it is necessary to consider the deterioration of recognition accuracy since the number of deletions is larger than the number of operations obtained from Formula (6), but the processing time T for one cycle can be shortened. That is, the processing time T for three cycles is required for the calculation processing of the neural network when $n=0$, and the processing can be ended for the calculation processing of the neural network within the processing time T for two cycles when $n=1$. Note that the value of n may be arbitrarily set by the user or may be set in advance.

$$78 - \mathrm{mod}(78, 20) - 20 = 40 \tag{12}$$

The number-of-operations setting unit 103 is not limited to the configuration in which the number of operations of the reduced neural network is set to be an integral multiple of the number of allocated calculators 302. The number-of-operations setting unit 103 is not necessarily set the number of operations of the reduced neural network to an integral multiple of the allocated number of the calculators 302. The number-of-operations setting unit 103 may set the number of operations of the reduced neural network such that a remainder, obtained by dividing the number of operations of the neural network before reduction by the number of allocated calculator 302 becomes half or more of the number of allocated calculator 302. For example, the number-of-operations setting unit 103 may set the number of operations using the following Formula (13). Note that k is ½ or less of the number of allocated calculators 302 set by the calculator allocation unit 102.

$$\text{Number of operations after reduction} = 78 - \mathrm{mod}(78, 20) - m \tag{13}$$

($m=0, 1, 2, \ldots, k$)

Figure 12:
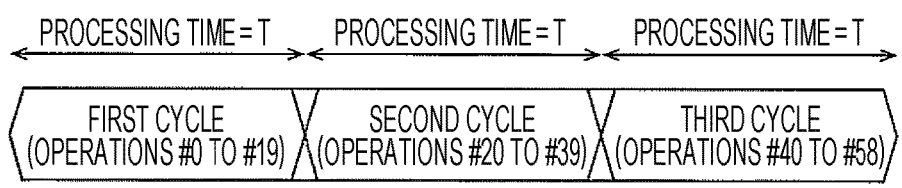
FIG. 12 is a view illustrating an example of the timing chart of the calculation processing of the neural network.

In Formula (13), the number of operations after reduction is changed depending on the value of m. For example, the number of operations is set to 60 times when $m=0$, the number of operations is set to 59 times when $m=1$, and the number of operations is set to $(60-k)$ times when $m=k$. As illustrated in FIG. 12, when the number of operations after the reduction is 59 times, only 19 calculators 302 out of the twenty calculators 302 are used in the calculation processing of the third cycle, and one calculator 302 is not used. Therefore, the use efficiency of the calculator 302 deteriorates, but a reduction rate of the neural network can be changed flexibly according to the recognition accuracy of the reduced neural network. Note that the value of m may be arbitrarily set by the user or may be set in advance.

Second Embodiment

Figure 13:
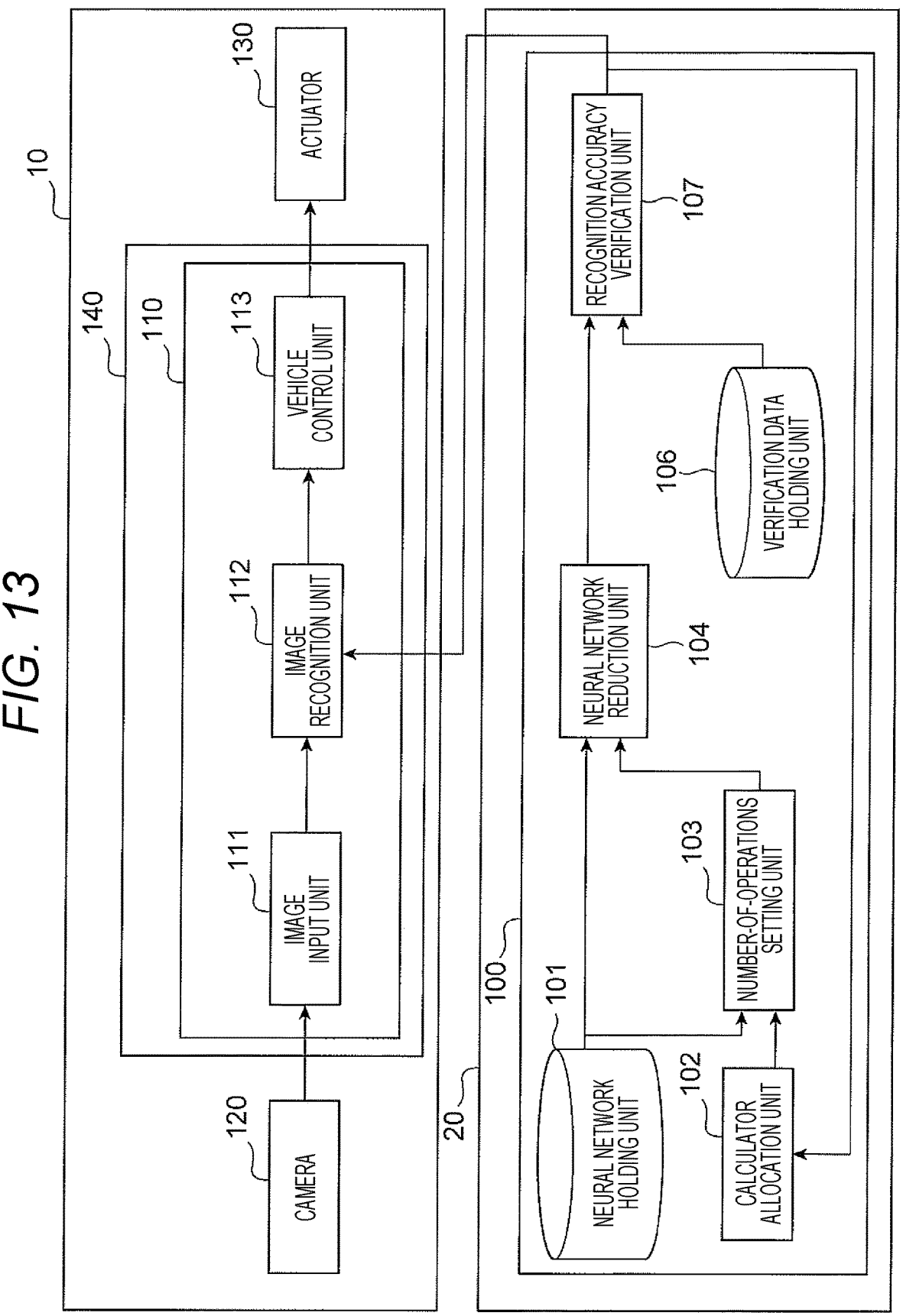
FIG. 13 is a block diagram of an autonomous driving system according to a second embodiment.

Hereinafter, an autonomous driving system according to a second embodiment will be described. The autonomous driving system according to the second embodiment is different from that of the first embodiment in that a neural network is reduced by adjusting the number of allocated calculators while verifying recognition accuracy of the neural network. Therefore, configurations similar to those of the first embodiment will not be described. FIG. 13 is a block diagram of the autonomous driving system according to the second embodiment. In FIG. 13, the same blocks as those of the autonomous driving system of the first embodiment are denoted by the same reference signs.

As illustrated in FIG. 13, the neural network reduction device 100 according to the second embodiment is provided with a verification data holding unit 106 and a recognition accuracy verification unit 107 as a function of verifying the recognition accuracy of the neural network. In the verification data holding unit 106, a verification value and a correct value are stored as verification data for verifying the recognition accuracy of a reduced neural network. The recognition accuracy verification unit 107 calculates recognition accuracy of the reduced neural network, and verifies the recognition accuracy by comparing the recognition accuracy with predetermined target accuracy. In this case, the recognition accuracy verification unit 107 inputs the verification value read from the verification data holding unit 106 to the reduced neural network, and collates an output value output from the neural network with the correct value read from the verification data holding unit 106 to calculate the recognition accuracy. Then, the recognition accuracy verification unit 107 compares the recognition accuracy with the target accuracy to verify the recognition accuracy with the target accuracy as a reference.

When the recognition accuracy verified by the recognition accuracy verification unit 107 is lower than the target accuracy, the recognition accuracy verification unit 107 notifies the calculator allocation unit 102 of an instruction to increase the number of allocated calculators. When receiving the instruction to increase the number of allocated calculators from the recognition accuracy verification unit 107, the calculator allocation unit 102 increases the number of allocated calculators by one and updates the number of allocated calculators. The number-of-operations setting unit 103 sets the number of operations of the reduced neural network based on the updated number of allocated calculators. On the other hand, when the recognition accuracy verified by the recognition accuracy verification unit 107 is equal to or higher than the target accuracy, the recognition accuracy verification unit 107 notifies the calculator allocation unit 102 of an instruction to decrease the number of allocated calculators. When receiving the instruction to decrease the number of allocated calculators from the recognition accuracy verification unit 107, the calculator allocation unit 102 decreases the number of allocated calculators by one and updates the number of allocated calculators. The number-of-operations setting unit 103 sets the number of operations of the reduced neural network based on the updated number of allocated calculators.

As an example, a specific description will be given with the neural network illustrated in FIG. 2 similarly to the first embodiment. The number of operations of the neural network before reduction is 78 times. When the number of allocated calculators is set to 20 by the calculator allocation unit 102, the number of operations is set to 60 times by the number-of-operations setting unit 103 using the following Formula (14). The neural network reduction unit 104 reduces 18 times of calculation processing of the neural network to reduce the neural network.

$$78-\mathrm{mod}(78,20)=60 \tag{14}$$

Next, the recognition accuracy verification unit 107 verifies the recognition accuracy for the reduced neural network. When the recognition accuracy verified by the recognition accuracy verification unit 107 is lower than the target accuracy, the number of allocated calculators is increased by one and updated to 21 by the calculator allocation unit 102. When the allocated number of calculators is updated, the calculator allocation unit 102 resets the number of operations to 63 times using the following Formula (15). The neural network reduction unit 104 reduces 15 times of calculation processing of the neural network to reduce the neural network again. Since the number of operations of the neural network is increased from 60 times to 63 times, the improvement in recognition accuracy can be expected.

$$78-\mathrm{mod}(78,21)=63 \tag{15}$$

Next, the recognition accuracy verification unit 107 verifies the recognition accuracy for the re-reduced neural network. When the recognition accuracy verified by the recognition accuracy verification unit 107 becomes equal to or higher than the target accuracy, a parameter of the neural network is notified to the image recognition unit 112 and used for image recognition processing on an image input from the camera 120. On the other hand, when the recognition accuracy verified by the recognition accuracy verification unit 107 becomes lower than the target accuracy, the number of allocated calculators is increased by one again by the calculator allocation unit 102. By repeating this processing, the recognition accuracy of the neural network can be made close to the target accuracy.

Note that the present invention is not limited to the configuration in which the instruction to increase the number of allocated calculators is fed back from the recognition accuracy verification unit 107 to the calculator allocation unit 102 so as to improve the recognition accuracy when the recognition accuracy of the reduced neural network is insufficient. When the recognition accuracy of the reduced neural network is higher than necessary, an instruction to decrease the number of allocated calculators may be fed back from the recognition accuracy verification unit 107 to the calculator allocation unit 102 so as to lower the recognition accuracy to the target accuracy.

As described above, the processing time of the calculation processing can be shortened and the use efficiency of the plurality of calculators can be enhanced in the autonomous driving system according to the second embodiment, which is similar to the first embodiment.

In addition, the number of allocated calculators for the calculation processing of the neural network can be adjusted according to the recognition accuracy of the reduced neural network. Accordingly, the number of operations of the neural network can be reduced to such an extent that the recognition accuracy of the neural network can be maintained at the target accuracy.

Third Embodiment

Figure 14:
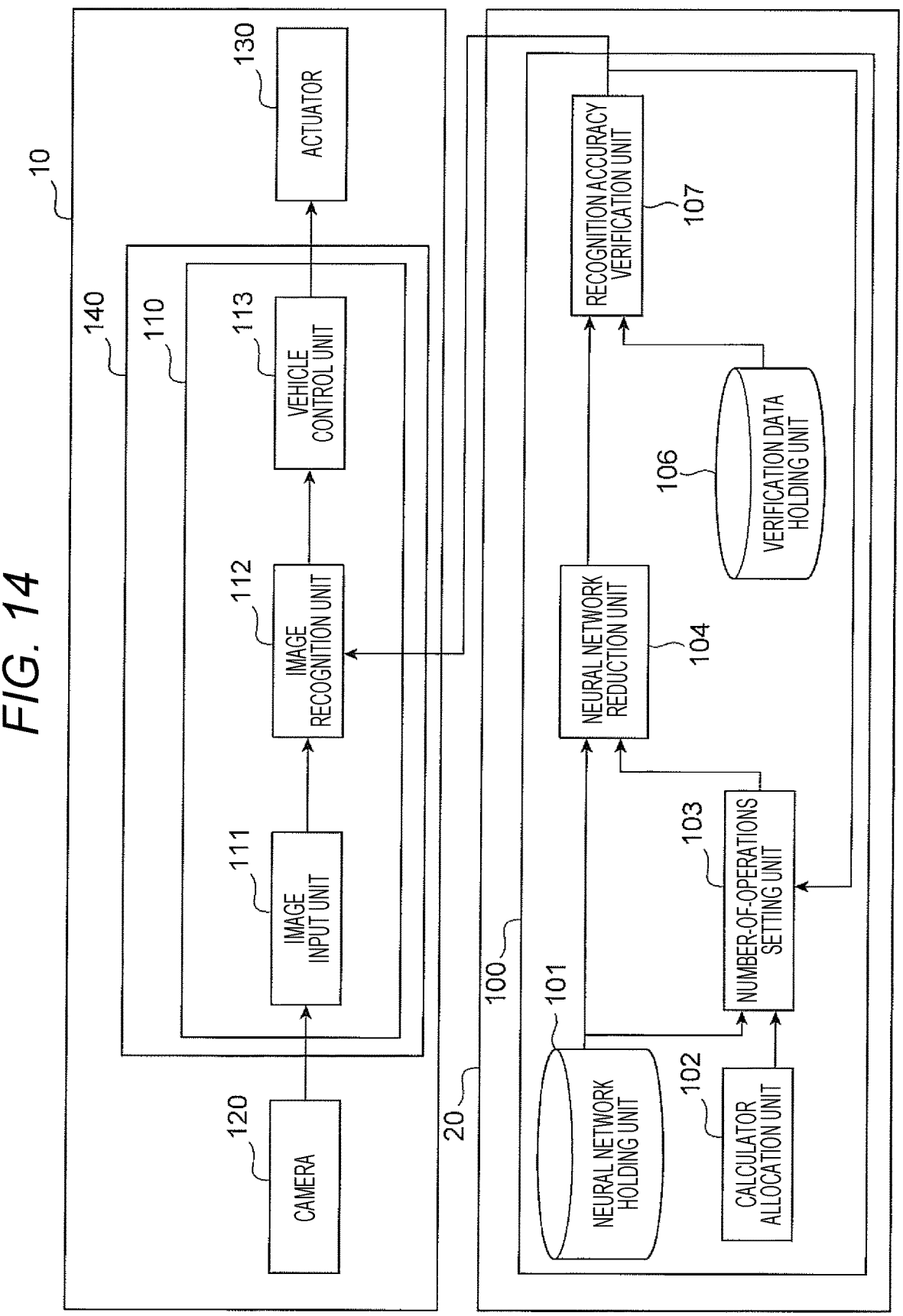
FIG. 14 is a block diagram of an autonomous driving system according to a third embodiment.

Hereinafter, an autonomous driving system according to a third embodiment will be described. The autonomous driving system according to the third embodiment is different from that of the second embodiment in that a neural network is reduced by adjusting the number of operations while verifying recognition accuracy of the neural network. Therefore, configurations similar to those of the first embodiment will not be described. FIG. 14 is a block diagram of the autonomous driving system according to the third embodiment. In FIG. 14, the same blocks as those of the autonomous driving system of the second embodiment are denoted by the same reference signs.

As illustrated in FIG. 14, the neural network reduction device 100 according to the third embodiment is configured to adjust the number of operations of the number-of-operations setting unit 103 based on a verification result of the recognition accuracy verification unit 107. That is, when the recognition accuracy verified by the recognition accuracy verification unit 107 is lower than the target accuracy, the recognition accuracy verification unit 107 notifies the number-of-operations setting unit 103 of an instruction to increase the number of operations. When receiving the instruction to increase the number of operations from the recognition accuracy verification unit 107, the number-of-operations setting unit 103 increases the number of operations of a reduced neural network and resets the number of operations. On the other hand, when the recognition accuracy verified by the recognition accuracy verification unit 107 is equal to or higher than the target accuracy, the recognition accuracy verification unit 107 notifies the number-of-operations setting unit 103 of an instruction to decrease the number of operations. When receiving the instruction to decrease the number of operations from the recognition accuracy verification unit 107, the number-of-operations setting unit 103 decreases the number of operations of a reduced neural network and resets the number of operations.

As an example, a specific description will be given with the neural network in FIG. 2 similarly to the first embodiment. The number of operations of the neural network before reduction is 78 times. When the number of allocated calculators is set to 20 by the calculator allocation unit 102, the number of operations is set by the number-of-operations setting unit 103 using the following Formula (16). As an example, when n=2 is set, the number-of-operations setting unit 103 sets the number of operations to 20 times. The neural network reduction unit 104 reduces 58 times of calculation processing of the neural network to reduce the neural network.

$$\text{Number of operations after reduction}=78-\text{mod}(78, 20)-20\times n \quad (16)$$

(n=0, 1, 2, and so on, wherein, the number of operations after reduction is a positive number)

Next, the recognition accuracy verification unit 107 verifies the recognition accuracy for the reduced neural network. When the recognition accuracy verified by the recognition accuracy verification unit 107 is lower than the target accuracy, the value of n in Formula (16) is decreased by one by the number-of-operations setting unit 103 such that n=1, and the number of operations is reset to 40 times. The neural network reduction unit 104 reduces 38 times of calculation processing of the neural network to reduce the neural network again. Since the number of operations of the neural network is increased from 20 times to 40 times, the improvement in recognition accuracy can be expected.

Next, the recognition accuracy verification unit 107 verifies the recognition accuracy for the re-reduced neural network. When the recognition accuracy verified by the recognition accuracy verification unit 107 becomes equal to or higher than the target accuracy, a parameter of the neural network is notified to the image recognition unit 112 and used for image recognition processing on an image input from the camera 120. On the other hand, when the recognition accuracy verified by the recognition accuracy verification unit 107 is lower than the target accuracy, the value of n in Formula (16) is increased by one again by the number-of-operations setting unit 103. By repeating this processing, the recognition accuracy of the neural network can be made close to the target accuracy.

Note that the present invention is not limited to the configuration in which the instruction to increase the number of operations is fed back from the recognition accuracy verification unit 107 to the number-of-operations setting unit 103 so as to improve the recognition accuracy when the recognition accuracy of the reduced neural network is insufficient. When the recognition accuracy of the reduced neural network is higher than necessary, an instruction to decrease the number of operations may be fed back from the recognition accuracy verification unit 107 to the number-of-operations setting unit 103 so as to lower the recognition accuracy to the target accuracy.

As described above, the processing time of the calculation processing can be shortened and the use efficiency of the plurality of calculators can be enhanced in the autonomous driving system according to the third embodiment, which is similar to the second embodiment.

In addition, the number of operations of the neural network can be adjusted according to the recognition accuracy of the reduced neural network. Accordingly, the number of operations of the neural network can be reduced to such an extent that the recognition accuracy of the neural network can be maintained at the target accuracy.

Fourth Embodiment

Figure 15:
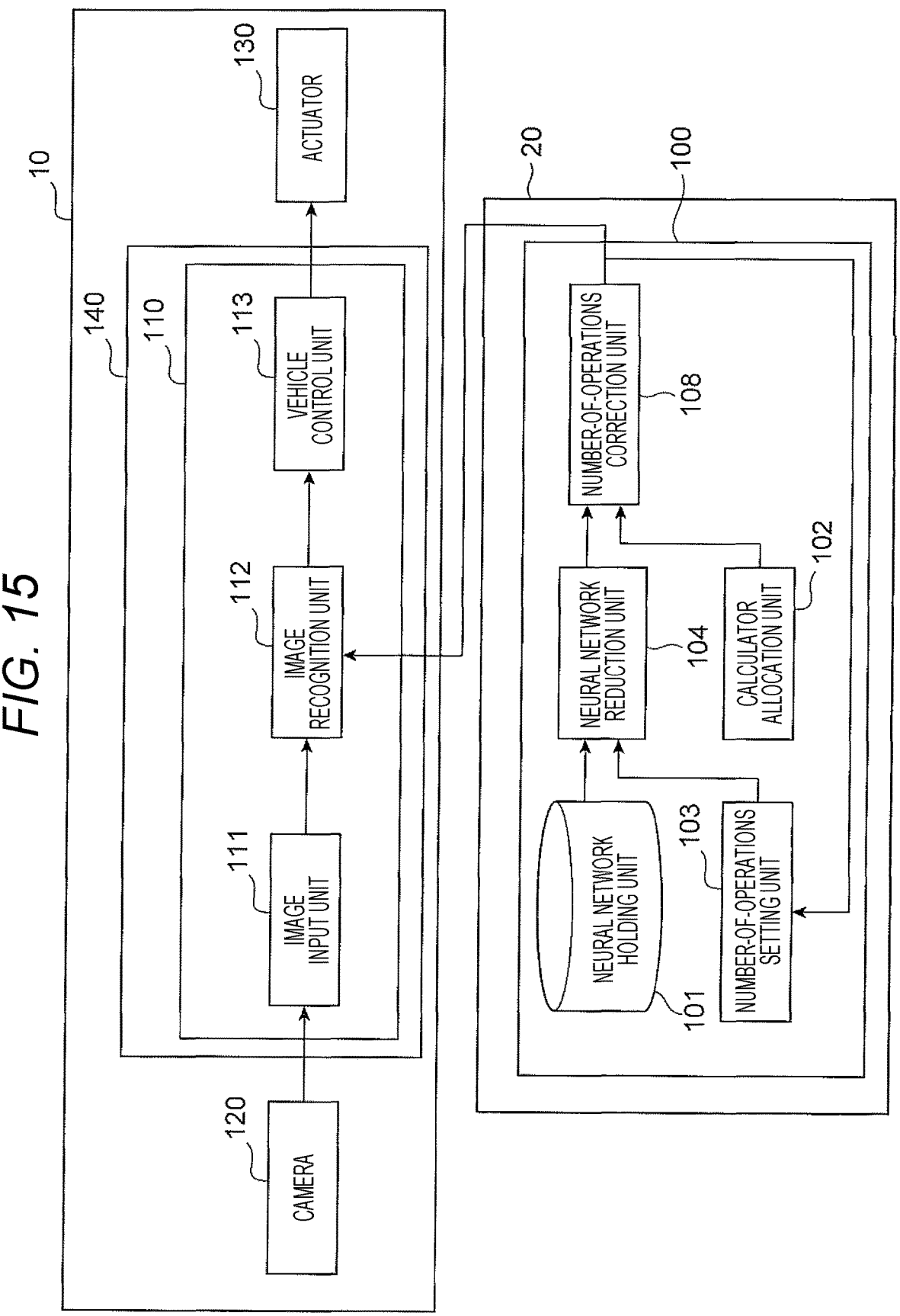
FIG. 15 is a block diagram of an autonomous driving system according to a fourth embodiment.

Hereinafter, an autonomous driving system according to a fourth embodiment will be described. The autonomous driving system according to the fourth embodiment is different from that of the first embodiment in that the number of operations of a reduced neural network is corrected by adjusting the number of allocated calculators. Therefore, configurations similar to those of the first embodiment will not be described. FIG. 15 is a block diagram of the autonomous driving system according to the fourth embodiment. In FIG. 15, the same blocks as those of the autonomous driving system of the first embodiment are denoted by the same reference signs.

The neural network reduction device 100 according to the fourth embodiment is provided with a number-of-operations correction unit 108 as a function of correcting the number of operations of the reduced neural network. The number-of-operations correction unit 108 corrects the number of operations of the reduced neural network based on the number of allocated calculators set by the calculator allocation unit 102. In this case, for the reduced neural network, the number-of-operations correction unit 108 corrects the number of operations of the neural network so as to be an integral multiple of the number of allocated calculators set by the calculator allocation unit 102.

As an example, a specific description will be given with the neural network illustrated in FIG. 2 similarly to the first embodiment. The number of operations of the neural network before reduction is 78 times. The number of operations of the reduced neural network is set to 39 times by the number-of-operations setting unit 103. The number of operations of the reduced neural network is half of the number of operations of a neural network before reduction. The neural network reduction unit 104 reduces 39 times of calculation processing to reduce the neural network. In addition, when the number of allocated calculators is set to 20 by the calculator allocation unit 102, the number of operations of the reduced neural network is corrected by the number-of-operations correction unit 108 using the following Formula (17).

$$\text{Number of operations after correction}=(\text{div}(39,20)+ \text{INT}(\text{div}(\text{mod}(39,20),20)+0.5))*20 \quad (17)$$

In Formula (17), div(A, B) represents processing of dividing A by B, and INT(X) represents processing of rounding down the decimal place of X. In an example of Formula (17), div(39, 20)=1 and INT(div(mod(39, 20), 20)+0.5)=1, and thus, Formula (17) becomes (1+1)*20, and the number of operation times after correction is set to 40 times. As a result, the number of operations of the reduced neural network can be corrected to be an integral multiple of the number of allocated calculators.

As described above, the processing time of the calculation processing can be shortened and the use efficiency of the plurality of calculators can be enhanced in the autonomous driving system according to the fourth embodiment of the present invention, which is similar to the first embodiment. In addition, it is possible to first reduce the neural network and correct the number of operations of the reduced neural network while considering the number of allocated calculators.

Note that the neural network reduction device used for the image recognition processing has been described in each of the above embodiments, but the present invention is not limited to this configuration. The neural network reduction device can also be applied to reduction of a neural network used for prediction processing of future data, in addition to other recognition processing such as voice recognition processing.

In addition, the neural network reduction device 100 is provided in the server 20 in each of the above embodiments, but the neural network reduction device 100 may be provided in the vehicle 10.

In addition, the number-of-operations setting unit 103 and the neural network reduction unit 104 are configured to calculate the number of operations of the neural network before reduction of the operation device 140 in each of the above embodiments, but the present invention is not limited to this configuration. The number of operations of the neural network before reduction may be held in advance in the neural network holding unit 101. In addition, the neural network reduction device 100 may be provided with a number-of-operations calculation unit that calculates the number-of-operations of the neural network before reduction.

In addition, the calculator allocation unit 102 sets the number of calculators 302 to be allocated to the calculation processing of the neural network in each of the above embodiments, but the present invention is not limited to this configuration. The calculator allocation unit 102 may set a ratio to be allocated to the calculation processing of the neural network out of the total number of calculators 302.

In addition, the number-of-operations setting unit 103 sets the number of operations of the neural network in the above fourth embodiment, but the present invention is not limited to this configuration. The number-of-operations setting unit 103 may set a reduction rate of the neural network instead of the number of operations of the neural network.

In addition, the number-of-operations correction unit 108 is configured to correct the number of operations of the reduced neural network so as to be an integer multiple of the number of allocated calculators in the above fourth embodiment, but the present invention is not limited to this configuration. The number-of-operations correction unit 108 may correct the number of operations for each layer of the neural network, and may correct the number of operations of the neural network such that a remainder, obtained by division by the number of allocated calculators, is equal to or more than half of the number of allocated calculators.

As described above, the neural network reduction device (100) according to the present embodiment is the neural network reduction device (100) that reduces the number of operations of the neural network by the operation device (140) including the plurality of calculators (302) by reducing the neural network, and includes: the calculator allocation unit (102) that sets the number of the calculators (302) allocated to calculation processing of the neural network; the number-of-operations setting unit (103) that sets the number of operations of the reduced neural network based on the number of the allocated calculators (302); and the neural network reduction unit (104) that reduces the neural network such that the number of operations of the neural network by the operation device (140) is equal to the number of operations set by the number-of-operations setting unit (103).

According to this configuration, the number of operations required for the calculation processing of the neural network is reduced in consideration of the number of allocated calculators (302) for the calculation processing of the neural network. That is, the number of operations per cycle that can be simultaneously processed by the plurality of calculators (302) allocated to the calculation processing of the neural network is considered. Accordingly, the number of operations of the neural network can be reduced so as to eliminate a cycle operated by only a small number of calculators (302) to shorten the processing time of the calculation processing and to enhance the use efficiency of the plurality of calculators (302).

In the neural network reduction device (100) according to the present embodiment, the number-of-operations setting unit (103) sets the number of operations of the reduced neural network to be smaller than the number of operations of the neural network before reduction and be an integral multiple of the number of allocated calculators (302) set by the calculator allocation unit (102) According to this configuration, the calculation processing is simultaneously started by the plurality of calculators 302 allocated to the calculation processing of the neural network, and the calculation processing is simultaneously ended. Accordingly, there is no cycle at which calculation is performed by only some of the calculators (302), and the processing time of the calculation processing can be shortened and the use efficiency of the plurality of calculators (302) can be maximized.

In the neural network reduction device (100) according to the present embodiment, the number-of-operations setting unit (103) sets the number of operations of the reduced neural network such that a remainder, obtained by dividing the number of operations of the neural network by the number of allocated calculators (302) set by the calculator allocation unit (102), becomes half or more of the number of allocated calculators (302). According to this configuration, the calculation processing is simultaneously started by the plurality of calculators (302) allocated to the calculation processing of the neural network, and the calculation processing is simultaneously ended by the calculators (302) which are half or more of the plurality of calculators (302). Accordingly, there is no cycle at which calculation is performed by only a small number of the calculators (302), and the processing time of the calculation processing can be shortened and the use efficiency of the plurality of calculators (302) can be enhanced.

In the reduction device (100) of the neural network according to the present embodiment, the neural network has a plurality of layers, the calculator allocation unit (102) sets the number of allocated calculators (302) for each layer of the neural network, and the number-of-operations setting unit (103) sets the number of operations of the reduced neural network for each layer of the neural network. According to this configuration, the calculation processing can be performed by a relatively small number of calculators, and thus, the mounting scale of the operation device (140) can be reduced.

In the neural network reduction device (100) according to the present embodiment, the neural network reduction unit (104) reduces the neural network by pruning processing. According to this configuration, it is possible to reduce the number of operations of the neural network while suppressing deterioration in accuracy of the neural network by the pruning processing.

The neural network reduction device (100) according to the present embodiment includes an accuracy verification unit (the recognition accuracy verification unit 107) that calculates accuracy of the reduced neural network and compares the accuracy with the target accuracy.

The calculator allocation unit (102) sets the number of allocated calculators (302) to be small when the accuracy is equal to or higher than the target accuracy, and the calculator allocation unit (102) sets the number of allocated calculators (302) to be large when the accuracy is lower than the target accuracy. According to this configuration, the number of allocated calculators (302) for the calculation processing of the neural network can be adjusted according to the accuracy of the reduced neural network. Accordingly, the number of operations of the neural network can be reduced to such an extent that the accuracy of the neural network can be maintained at the target accuracy.

The neural network reduction device (100) according to the present embodiment includes the accuracy verification unit (recognition accuracy verification unit 107) that calculates accuracy of the reduced neural network and compares the accuracy with the target accuracy. The number-of-operations setting unit (103) sets the number of operations of the reduced neural network to be small when the accuracy is equal to or higher than the target accuracy, and the number-of-operations setting unit (103) sets the number of operations of the reduced neural network to be large when the accuracy is lower than the target accuracy. According to this configuration, the number of operations of the neural network can be adjusted according to the accuracy of the reduced neural network. Accordingly, the number of operations of the neural network can be reduced to such an extent that the accuracy of the neural network can be maintained at the target accuracy.

The neural network reduction device (100) according to the present embodiment is the neural network reduction device (100) that reduces the number of operations of the neural network by the operation device (140) including the plurality of calculators (302) by reducing the neural network, and includes: the number-of-operations setting unit (103) that sets the number of operations of the reduced neural network; the neural network reduction unit (104) that reduces the neural network such that the number of operations of the neural network by the operation device (140) is equal to the number of operations set by the number-of-operations setting unit (103); the calculator allocation unit (102) that sets the number of allocated calculators (302) for calculation processing of the neural network; and the number-of-operations correction unit (108) that corrects the number of operations of the reduced neural network based on the number of allocated calculators (302).

According to this configuration, the number of operations required for the calculation processing of the reduced neural network is corrected in consideration of the number of allocated calculators (302) for the calculation processing of the neural network. That is, the number of operations per cycle that can be simultaneously processed by the plurality of calculators (302) allocated to the calculation processing of the neural network is considered. Accordingly, the number of operations of the neural network can be corrected so as to eliminate a cycle operated by only a small number of calculators to shorten the processing time of the calculation processing and to enhance the use efficiency of the plurality of calculators (302).

As above, the embodiments of the present invention have been described in detail, but the present invention is not limited to the above-described embodiments, and various design modifications can be made without departing from the spirit of the present invention recited in the claims. For example, the above-described embodiments have been described in detail in order to describe the present invention in an easily understandable manner, and are not necessarily limited to one including the entire configuration that has been described above. In addition, configurations of another embodiment can be substituted for some configurations of a certain embodiment, and in addition, a configuration of another embodiment can be added to a configuration of a certain embodiment. Further, addition, deletion, or substitution of other configurations can be made with respect to some configurations of each embodiment.

REFERENCE SIGNS LIST 100 neural network reduction device
102 calculator allocation unit
103 number-of-operations setting unit
104 neural network reduction unit
107 recognition accuracy verification unit (accuracy verification unit)
108 number-of-operations correction unit
140 operation device
302 calculator

The invention claimed is:

1. A neural network reduction device that reduces a number of operations of a neural network by an operation device including a plurality of calculators by reducing the neural network, the neural network reduction device comprising:
a calculator allocation unit that sets a number of the calculators allocated for calculation processing of the neural network, each of the calculators configured to execute a respective operation portion in each cycle of the calculation processing;
a number-of-operations setting unit that determines a number of operations of the neural network based on the number of the allocated calculators and sets the number of operations for the calculation processing;
a neural network reduction unit that reduces the neural network to generate a reduced neural network, such that the number of operations of the neural network is equal to the number of operations set by the number-of-operations setting unit;
an accuracy verification unit that
calculates accuracy of the reduced neural network, and compares the accuracy with target accuracy,
wherein in response to the comparison, the calculator allocation unit decreases the number of the allocated calculators based on the accuracy being greater than or equal to the target accuracy or increases the number of the allocated calculators based on the accuracy being less than the target accuracy; and
a number-of-operations correction unit that updates the number of operations of the reduced neural network in response to increases or decreases in the number of the allocated calculators by the calculator allocation unit, wherein the updated number of operations is an integral multiple of the number of the allocated calculators.

2. The neural network reduction device according to claim 1, wherein the number-of-operations setting unit sets the number of operations of the reduced neural network to be smaller than the number of operations of the neural network before reduction and be an integral multiple of the number of the allocated calculators set by the calculator allocation unit before the reduction.

3. The neural network reduction device according to claim 1, wherein the number-of-operations setting unit sets the number of operations of the reduced neural network such that a remainder, obtained by dividing the number of operations of the neural network before reduction by the number of the allocated calculators set by the calculator allocation unit, is equal to or more than half of the number of the allocated calculators.

4. The neural network reduction device according to claim 1, wherein
the neural network includes a plurality of layers,
the calculator allocation unit sets the number of the allocated calculators for each of the layers of the neural network, and
the number-of-operations setting unit sets the number of operations of the reduced neural network for each of the layers of the neural network.

5. The neural network reduction device according to claim 1, wherein the neural network reduction unit reduces the neural network by pruning processing.

6. The neural network reduction device according to claim 1,
wherein the number-of-operations setting unit sets the number of operations of the reduced neural network to be small when the accuracy is equal to or higher than the target accuracy, and the number-of-operations setting unit sets the number of operations of the reduced neural network to be large when the accuracy is lower than the target accuracy.

7. A neural network reduction device that reduces a number of operations of a neural network by an operation device including a plurality of calculators by reducing the neural network, the neural network reduction device comprising:
a number-of-operations setting unit that sets a number of operations for calculation processing of the neural network;
a neural network reduction unit that reduces the neural network to generate a reduced neural network, such that the number of operations of the neural network is equal to the number of operations set by the number-of-operations setting unit;
a calculator allocation unit that sets a number of the calculators allocated for the calculation processing of the neural network, each of the calculators configured to execute a respective operation portion in each cycle of the calculation processing;
a number-of-operations correction unit that receives, from the calculator allocation unit, an indication of decreases in the number of the allocated calculators based on accuracy of the reduced neural network being greater than or equal to a target accuracy or increases the number of the allocated calculators based on the accuracy of the reduced neural network being less than the target accuracy; and
updates the number of operations of the reduced neural network in response to increases or decreases in the number of the allocated calculators set by the calculator allocation unit, wherein the updated number of operations is an integral multiple of the number of the allocated calculators.

* * * * *